F. L. COOK
Bevel.
No. 207,950. Patented Sept. 10, 1878.
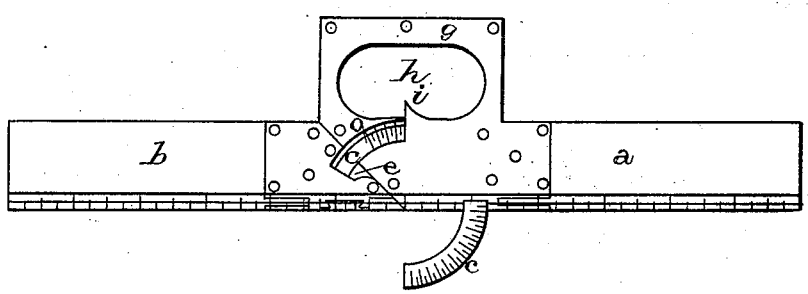
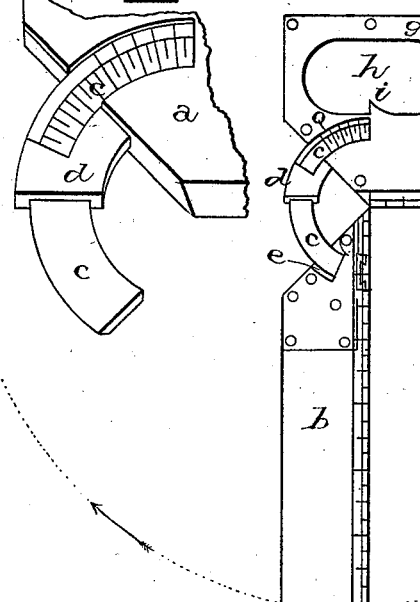
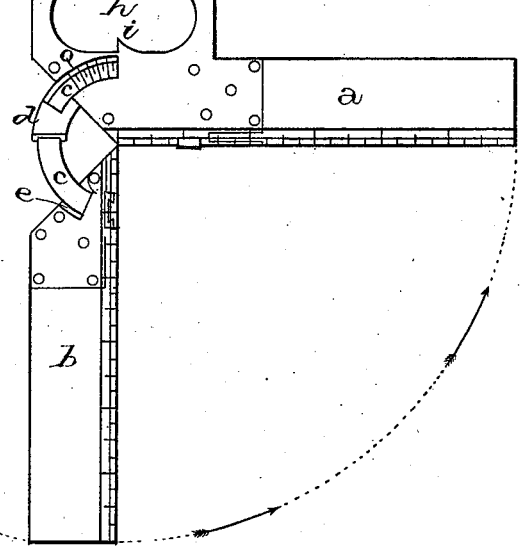
Witnesses.
J. W. Garner
W. S. A. Haines
Inventor.
F. L. Cook,
per
F. A. Lehmann,
Atty.

UNITED STATES PATENT OFFICE.

FRANCIS L. COOK, OF FAIRFIELD, IOWA.

IMPROVEMENT IN BEVELS.

Specification forming part of Letters Patent No. 207,950, dated September 10, 1878; application filed July 10, 1878.

*To all whom it may concern:*

Be it known that I, FRANCIS L. COOK, of Fairfield, in the county of Jefferson and State of Iowa, have invented certain new and useful Improvements in Bevels; and I do hereby declare the following to be a full, clear, and exact description of the invention, such as will enable others skilled in the art to which it pertains to make and use it, reference being had to the accompanying drawings, which form part of this specification.

My invention relates to an improvement in combined bevel and rule; and it consists in connecting two straight rules together by means of a curved slide, whereby they may be closed together or opened out on a straight line, so that any angle up to one hundred and eighty degrees can be laid off.

It further consists in the arrangement and combination of parts, that will be more fully described hereinafter.

The accompanying drawings represent my invention.

*a b* represent two straight rules of any desired length, and which have one edge beveled away and divided into inches, the numbers representing inches running from the inner ends outward on both rules, instead of continuously along in the usual manner. Both rules are preferably of the same length along their beveled edge; but their opposite edges are of unequal length. Both of these rules may be made entirely of metal; or the outer ends may be made of wood and the inner ends of metal, as here shown.

Rigidly secured to the rule *b* is the curved slide *c*, which forms nearly three-quarters of a circle, has its top surface laid off into equal spaces, and passes around through the dovetailed opening or hole in the metal part of the rule *a*. As this slide is not fastened to the rule *a*, but moves freely through it, the rules may be closed inward toward each other until their beveled edges meet, or outward until their edges form a straight line, thus sweeping through one hundred and eighty degrees.

Projecting from the beveled inner end of the rule *a* is the curved guide *d*, through which the slide *c* moves, and which has an opening, *o*, through its top, so that the scale on the slide may be readily seen. On one side of the slot is made a corresponding scale, whereby the rules may be set to form any desired angle.

Through the metallic end of the rule *b* is formed an opening, *e*, into which the curved guide *d* enters when the two rules are in a line with each other, and thus forms a brace for holding them rigidly together. By having the figures on each rule run from the center outward, the length of any angle from its center may be seen at a glance.

Upon the back of the rule *a*, at its inner end, is made the extension *g*, through which extension is made the opening *h*, and projecting into this opening from the rear edge of the rule is the point *i*, one side of which is straight and forms a line with the inner end of the beveled edge of rule *a*.

The extension *g* is for sliding the rule upon a straight edge, while the point is on a line passing through the center of a circle and perpendicular to the edge of the rule, and serves as an indicator to measure off distances on a rule when it is intended to draw parallel lines at certain distances from each other. This rule can be used as a triangle, parallel rule, and protractor.

I am aware that bevels have been made by uniting together two rules by means of a curved guide, the ends of the said rules being beveled in opposite directions, so as to only allow them to open or move one-quarter of a circle, and this I disclaim. In my bevel both rules have their ends beveled in the same direction, and are united by a curved guide that forms over half a circle.

Having thus described my invention, I claim—

1. The combination of the two rules *a b*, having their ends beveled in the same direction, curved guide *c*, forming half a circle, extension *d*, and recess *e'*, there being an opening, *o*, through the end of the rule *a*, so that the number of degrees on the guide *c* may be seen, substantially as shown.

2. The combination of the two rules *a b*, slide *c*, extension *g*, and point *i*, substantially as set forth.

In testimony that I claim the foregoing I have hereunto set my hand this 3d day of July, 1878.

FRANCIS L. COOK.

Witnesses:
FRED. W. COOK,
GEO. D. CLARKE.